Feb. 18, 1947. A. G. CARPENTER 2,416,085
VALVE
Filed July 19, 1943
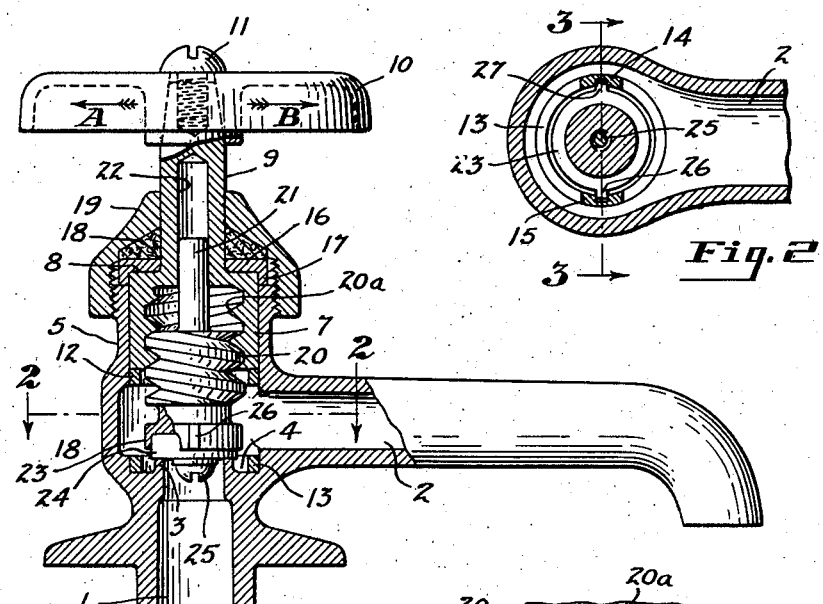
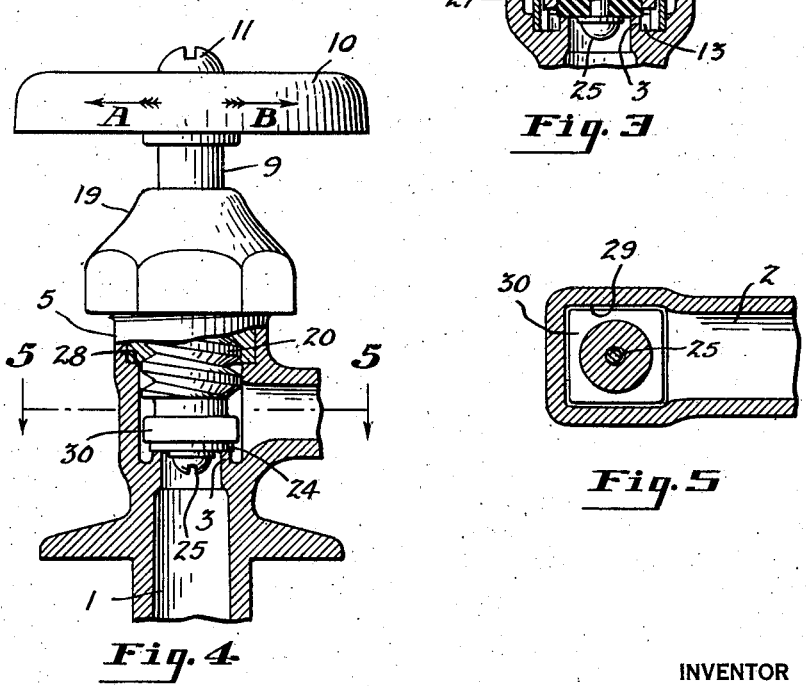
INVENTOR
Adelbert G. Carpenter
BY John Mahoney
ATTORNEY Patented Feb. 18, 1947

2,416,085

UNITED STATES PATENT OFFICE 2,416,085
VALVE

Adelbert G. Carpenter, Bedford, Ohio

Application July 19, 1943, Serial No. 495,369

4 Claims. (Cl. 251—48)

My invention relates to valves for fluid mains or conduits, such as water faucets or the like, and more particularly to a valve of this type which in its closed position provides an effective seal against the leakage of fluid under pressure.

In water faucets of ordinary construction, considerable difficulty has been experienced in providing valves which maintain the gasket or disk carried by the movable part in sealed engagement with the valve seat, and the constant leakage with its attendant dripping noise which frequently occurs in such faucets is not only exceedingly annoying but the continued use of such valves results in a considerable wastage of water which often has previously been heated.

It is the aim of the present invention to provide an improved valve for fluid mains or conduits which may be constructed in a simple and economical manner and which provides a firm seating of a gasket or disk secured to a movable part of the valve upon its seat. According to my invention this is effected by providing a valve construction having a part which is movable to open and closed position without causing rotary movement of the gasket associated therewith. As the result of my improved construction, when the gasket is new, portions thereof are forced into depressions or rough spots on the valve seat and during use of the valve the small projecting portions thus formed repeatedly enter into the same depressions, assuring a tight sealing engagement of the gasket upon its seat during the lift of the gasket, and since there is no rotary movement of the gasket when the valve is closed, it will have a comparatively long life in service.

It is therefore an object of my invention to provide an improved valve structure including a part having a gasket or disk affixed to or associated therewith which is movable in a plane perpendicular or normal to the plane of the valve seat without causing rotary movement of either the movable valve part or the gasket or disk associated therewith.

Another object of my invention is to provide an improved valve structure including a valve seat and a gasket-carrying valve member movable normal to the plane of the seat in which direct pressure can be applied to all portions of the gasket which engage the valve seat.

A further object of my invention is to provide a valve construction having a valve seat and a gasket-carrying member movable perpendicular or normal to the plane of the valve seat to force protruberances formed on the gasket during its initial use to repeatedly fit into depressions or rough spots formed in the valve seat, thereby assuring a valve which is free from leakage during the life of the gasket.

Other objects and advantages of my invention will be apparent as the specification proceeds.

My invention will be better understood by reference to the accompanying drawing, in which:

Fig. 1 is a cross sectional view of my improved valve with parts in elevation, showing its use in an ordinary water faucet;

Fig. 2 is a cross sectional view taken on a plane passing through line 2—2 of Fig. 1;

Fig. 3 is a cross sectional view on the line 3—3 of Fig. 2, looking in the direction of the arrows;

Fig. 4 is a view partly in elevation and partly in section of a modified form of my improved valve; and Fig. 5 is a cross sectional view on the line 5—5 of Fig. 4.

While my improved valve may be utilized in association with fluid main or conduits of any desired type, as illustrated in the drawing, it is shown utilized for closing and opening a passage in the conduit means 1 of an ordinary water faucet in which water under pressure is forced through the conduit means and the spout 2 when the valve is open.

As illustrated, the conduit means is provided with an interiorly arranged annular flange 3 surrounded by an annular groove or depression 4 to provide a valve seat and is extended upwardly beyond spout 2 to form an annular exteriorly threaded casing 5 which receives the movable parts of the valve.

In my improved construction, one of the movable parts of the valve rotates within the casing 5 and the other part is movable axially relative to the rotatable part and perpendicular or normal to the plane of the valve seat. As illustrated in the drawing, the rotatable part has an annular interiorly threaded body portion 7, the outer periphery of which fits snugly against but is rotatable within the casing 5, a shoulder 8, and a stem 9 which extends outwardly beyond the casing and to which the handle 10 of the valve is attached by any suitable means, such as a screw 11.

Means are provided to prevent axial movement of the rotatable portion of the valve and provide a seal to prevent leakage of the liquid through the casing 5. While any suitable means may be provided for this purpose and I do not desire to be limited to the structure shown, as illustrated in the drawing, the rotatable part is prevented from axial movement toward the seat 3 by means of a bracket having an upper ring 12 arranged adjacent the lower portion of casing 5 which is supported by a lower ring 13 arranged in the outer portion of recess 4 and a pair of internally grooved spaced standards 14 and 15 welded or otherwise affixed to the two rings as shown more particularly in Figs. 2 and 3 of the drawing.

Outward movement of the rotatable part is prevented by means which also constitute a sealing device to prevent leakage of the liquid through casing 5, and while any desirable structure may be provided for this purpose, as illustrated in the drawing a washer 16 bears upon shoulder 8 and has an annular flange 17 engaging the outer periphery of body portion 7 and a suitable packing material 18, such as rubber or felt, is interposed between the washer 16 and a cap or bonnet 19, the lower portion of which cap or bonnet is threaded on the casing and the upper portion of which is tapered inwardly to snugly receive the stem 9. It will of course be understood that the stem 9 may rotate in cap or bonnet 19 and that the cap or bonnet may be rotated relative to the stem.

The other movable portion of the valve is associated with the body portion 7 and stem 9 in such a manner that upon rotary movement of the body portion 7 by handle 10 in one direction, it is moved axially relative to the body portion 7 and in a direction normal or perpendicular to the plane of the valve seat to close the opening in the conduit means, and when handle 10 is turned in the opposite direction it is moved axially in the opposite direction to open the conduit means. For this purpose the axially movable part of the valve is threaded as indicated by the numeral 20 to engage threads 20a in body portion 7, and its upper portion is in the form of a rod or pin 21 movable in a bore 22 formed in stem 9 and its lower portion in the form of an annular flange 23, the outer periphery of which extends outwardly slightly beyond the valve seat and in which a gasket or disk 24 is secured by suitable means, such as a screw 25. As illustrated, bore 22 of stem 9 communicates with the chamber defined by the threaded portion of the rotatable part.

As illustrated in the drawing, the threads 20 on the axially movable member are arranged opposite the interior threads on the body 7 so that upon movement of the handle 10 in the direction of the arrow A, as indicated in Figs. 1 and 4 of the drawing, the axially movable member will be moved downwardly to force gasket or disk 24 in sealing engagement with the valve seat and when the handle 10 is moved in the opposite direction as indicated by the arrow B, the axially movable member is moved in the opposite direction to provide communication between conduit means 1 and spout 2. When the gasket 24 is forced against its seat, it will be noted that the annular flange prevents lateral expansion of the gasket.

Various means may be provided to prevent rotary movement of the axially movable member during rotary movement of the body 7. As illustrated in Figs. 1 and 2, projections or lugs 26 and 27 are formed on the flange 23 which extend into the grooves formed in standards 14 and 15.

Another means of preventing rotative movement of the axially movable member is illustrated in Figs. 4 and 5 of the drawing. In this modification rings 12 and 13 with their associated standards are omitted, a shoulder 28 is provided in the lower portion of casing 5 to prevent inward axial movement of body portion 7, and the interior portion of conduit means 1 which extends above the valve seat is of rectangular shape as indicated by the numeral 29 to slidingly receive a gasket-carrying member 30 having an angular-shaped depending flange 30.

It will be noted that in my improved construction the handle may be rotated in the usual manner as indicated by the arrows A and B to close and open the valve and that the gasket-carrying member extends beyond the valve seat so that the gasket may be forced in firm sealing engagement with the seat. The valve parts may also be readily dismantled for inspection or repairs, such as for inserting a new gasket, by simply removing cap or bonnet 19 and the movable valve parts.

What I claim is:

1. A valve construction including conduit means provided with an opening, a valve seat surrounding said opening, a casing extending beyond the valve seat and terminating in an externally threaded annular flange; a rotatable first valve part having an interiorly threaded portion forming an interior chamber, an outer periphery which snugly engages the interior portion of said flange over substantially its entire length, a shoulder extending a short distance above said flange, and a stem extending outwardly from said shoulder which is provided with a bore communicating with said chamber; means for preventing longitudinal movement of the first valve part and the egress of fluid through said flange including a disk surrounding said valve stem having an annular flange bearing on the edge of the flange of said casing, a bonnet threaded to the exterior threads on said flange and having an aperture through which said stem extends, and packing means interposed between said bonnet and disk; a second valve part threaded to the interior threads of the first valve part and being provided with a gasket-carrying member at one end and a stem at the other end which is always snugly received in the bore of the first valve part, and means associated with said gasket-carrying member and said casing for preventing rotation of the second valve part.

2. A valve construction including conduit means provided with an opening, a casing having a portion bulged outwardly from said opening and terminating in an annular flange having a smooth inner periphery and being of less diameter than the bulged portion, a first valve part having its lower portion terminating adjacent the bottom of said flange, said valve part being provided with an interiorly threaded portion and a cylindrical outer portion snugly engaging the inner periphery of said flange but being freely rotatable therein, a second valve part threaded to the interior threads of the first valve part and being movable in a direction normal to the plane of the valve seat in response to the rotation of the first valve part, means for preventing outward movement of the first valve part, and means for preventing inward movement of the first valve part including a lower ring bearing against the casing and spaced outwardly from the valve part, an upper ring arranged in said casing adjacent the lower portion of said flange and engaging the inner portion of the first valve part, and spaced standards connecting said rings.

3. A valve construction including conduit means provided with an opening, a casing extending outwardly beyond the valve seat and terminating in an annular flange, a first valve part having a cylindrical outer periphery rotatable in said flange and having an interiorly threaded portion, a second valve part movable in a direction normal to the plane of the valve seat in response to the rotation of the first valve part and having one end threaded to the interior threads on the first valve part and a gasket-carrying member at the other end of greater peripheral extent than said valve seat and having lugs projecting outwardly therefrom, means for preventing outward movement of the first valve part, means for preventing inward movement of the first valve part including a lower supporting ring bearing against the lower portion of said casing, an upper ring engaging the inner portion of the first valve part and standards for spacing said rings, and means for preventing rotation of the second valve part including grooves formed in said standards for receiving the lugs projecting outward from said gasket carrying member.

4. A valve construction including conduit means provided with an opening, a valve seat surrounding said opening, a casing extending outwardly beyond the valve seat and terminating in an annular flange arranged a substantial distance above said valve seat, a first valve part having a cylindrical outer periphery rotatable in said flange which terminates adjacent the bottom of said flange and an interiorly threaded portion, a second valve part threaded to the interior threads of the first valve part and being movable in a direction normal to the plane of the valve seat in response to the rotation of the first valve part, means for preventing outward movement of the first valve part, and means for preventing inward movement of the first valve part including a lower supporting ring bearing against the lower portion of said casing and spaced outwardly from the valve seat, an upper ring engaging the lower portion of the first valve part, and narrow standards for spacing said rings.

ADELBERT G. CARPENTER.

REFERENCES CITED

The following references are of record in the file of this patent:

UNITED STATES PATENTS

| Number | Name | Date |
| --- | --- | --- |
| 2,089,848 | Hoferle | Aug. 10, 1937 |
| 1,579,776 | Monteagle | Apr. 6, 1926 |
| 1,555,552 | Cheetham | Sept. 29, 1925 |
| 1,552,710 | Knudsen | Sept. 8, 1925 |
| 1,211,195 | Lorenzen | Jan. 2, 1917 |
| 969,576 | Turner | Sept. 6, 1910 |
| 251,668 | Wiltse | Dec. 27, 1881 |
| 922,294 | Kobus | May 18, 1909 |
| 860,141 | Lavinge | July 16, 1907 |

FOREIGN PATENTS

| Number | Country | Date |
| --- | --- | --- |
| 61,724 | German | 1892 |